United States Patent
Lin

(10) Patent No.: US 9,193,240 B2
(45) Date of Patent: Nov. 24, 2015

(54) DAMPING ASSEMBLY FOR A FRONT-WHEEL INDEPENDENT SUSPENSION OF A FOUR-WHEEL MOBILITY SCOOTER

(71) Applicant: Chung-Chuan Lin, Taichung (TW)

(72) Inventor: Chung-Chuan Lin, Taichung (TW)

(*) Notice: Subject to any disclaimer, the term of this patent is extended or adjusted under 35 U.S.C. 154(b) by 68 days.

(21) Appl. No.: 14/249,589

(22) Filed: Apr. 10, 2014

(65) Prior Publication Data
US 2015/0290990 A1 Oct. 15, 2015

(51) Int. Cl.
*A61G 5/04* (2013.01)
*B60G 13/00* (2006.01)
*B60G 3/20* (2006.01)
*A61G 5/10* (2006.01)

(52) U.S. Cl.
CPC ............... *B60G 13/005* (2013.01); *A61G 5/04* (2013.01); *B60G 3/20* (2013.01); *A61G 2005/1078* (2013.01); *A61G 2200/34* (2013.01)

(58) Field of Classification Search
CPC ........................................ B60G 3/20
See application file for complete search history.

(56) References Cited

U.S. PATENT DOCUMENTS

| | | | | |
|---|---|---|---|---|
| 3,337,261 A | * | 8/1967 | Nihlean et al. | 297/44 |
| RE28,259 E | * | 12/1974 | Henschen | 267/279 |
| 3,883,153 A | * | 5/1975 | Singh et al. | 280/124.104 |
| 5,411,287 A | * | 5/1995 | Henschen | 280/124.169 |
| 5,996,716 A | * | 12/1999 | Montiglio et al. | 180/65.51 |
| 6,070,898 A | * | 6/2000 | Dickie et al. | 280/304.1 |
| 6,186,252 B1 | * | 2/2001 | Schaffner et al. | 180/65.1 |
| 6,695,081 B2 | * | 2/2004 | Chu et al. | 180/65.1 |
| 6,752,411 B2 | * | 6/2004 | Few | 280/124.169 |
| 6,796,568 B2 | * | 9/2004 | Martis et al. | 280/124.111 |
| 6,851,711 B2 | * | 2/2005 | Goertzen et al. | 280/755 |
| 7,222,881 B1 | * | 5/2007 | Zhou | 280/755 |
| 7,789,408 B2 | * | 9/2010 | Sloan et al. | 280/124.166 |
| 8,210,552 B2 | * | 7/2012 | Nance | 280/124.135 |
| 8,434,775 B2 | * | 5/2013 | Patmont et al. | 280/250.1 |
| 8,573,621 B1 | * | 11/2013 | Reynolds | 280/124.166 |
| 9,039,018 B1 | * | 5/2015 | Lin | 280/86.5 |
| 9,073,399 B1 | * | 7/2015 | Richter | 1/1 |
| 2008/0116660 A1 | * | 5/2008 | Nicholls | 280/286 |

FOREIGN PATENT DOCUMENTS

DE 10106689 A1 * 8/2002 ............... B60G 3/00
DE 202014105308 U1 * 1/2015

* cited by examiner

*Primary Examiner* — Nicole Verley
(74) *Attorney, Agent, or Firm* — Patent Office of Bang Shia

(57) ABSTRACT

A damping assembly for a front-wheel independent suspension of a four-wheel mobility scooter includes a chassis with two front wheels, and two connecting sleeves. In each of the connecting sleeves is disposed a first shock absorber which includes a rectangular outer pipe and a rectangular inner pipe disposed in and rotated 45 degrees with respect to the outer pipe, between each of the edges of the inner pipe and the inner space of the outer pipe is disposed an elastic rubber The inner pipe has two suspension arms connected to a shaft, respectively, each shaft includes a first connecting arm extending in a width direction of the chassis, the front wheels are connected to the first connecting arms, on each of the shafts is provided a second connecting arm extending upward and hinged with a third connecting arm extending in the width direction of and hinged to the chassis.

4 Claims, 6 Drawing Sheets

DAMPING ASSEMBLY FOR A FRONT-WHEEL INDEPENDENT SUSPENSION OF A FOUR-WHEEL MOBILITY SCOOTER

BACKGROUND OF THE INVENTION

1. Field of the Invention

The present invention relates to a four-wheel mobility scooter, and more particularly to a damping assembly for a front-wheel independent suspension of a four-wheel mobility scooter.

2. Description of the Prior Art

Mobility scooters are environment friendly mobility aids which are very suitable for elders, disabled people and middle aged people and can get people any place they want. For example, people can use it when going to a garden, shopping around, or dropping off and picking up child. However, the road surface that the mobility scooter runs is never always smooth. Therefore, to enhance sitting comfort, the mobility scooters must be equipped with shock absorbers which normally are in the form of a spring disposed between the seat and the chassis. However, the shock absorbing effect of the spring is not good since it only works in the height direction. Besides, the spring shock absorber is complicated in structure, costly to assemble, and requires a certain amount of height, which is not conducive to miniaturization of the mobility scooter.

The present invention has arisen to mitigate and/or obviate the afore-described disadvantages.

SUMMARY OF THE INVENTION

The primary objective of the present invention is to provide a damping assembly for a front-wheel independent suspension of a four-wheel mobility scooter, wherein all the front wheels of the wheelchair can be independently suspended from the chassis to improve shock absorbing effect.

To achieve the above objective, a damping assembly for a front-wheel independent suspension of a four-wheel mobility scooter in accordance with the present invention comprises a chassis with two front wheels, and two connecting sleeves located at two sides of the chassis and extending in a width direction of the chassis. In each of the connecting sleeves is disposed a first shock absorber which includes a rectangular outer pipe and a rectangular inner pipe disposed in and rotated 45 degrees with respect to the outer pipe, so that edges of the inner pipe are abutted against the inner surface of the outer pipe, between each of the edges of the inner pipe and the inner space of the outer pipe is disposed an elastic rubber, at two ends of the inner pipe of the respective first shock absorbers are fixed two suspension arms which are connected to a shaft, respectively, each of the shafts is provided with a first connecting arm extending in a width direction of the chassis, the front wheels are connected to the first connecting arms, on each of the shafts is provided a second connecting arm which extends upward and is hinged with a third connecting arm extending in the width direction of and hinged to the chassis, the front wheels are independently suspended from the chassis via the first shock absorbers 4 and the suspension arms.

Preferably, a square pipe is inserted in the inner pipe of the respective first shock absorbers and engaged in a square cavity formed in each of the suspension arms, then a bolt is inserted through the corresponding suspension arm and screwed with a nut, so as to fix the suspension arm to the square pipe.

Preferably, each of the third connecting arms has two ends hinged to the chassis and a corresponding one of the second connecting arms by a universal rotation means.

Preferably, each of the third connecting arms has two ends hinged to the chassis and a corresponding one of the second connecting arms by a universal rotation means.

With the suspension arms and the first shock absorbers, each of the front wheels can be independently suspended from the chassis, unlike the conventional suspension, in which springs are disposed between the seat and the chassis. When the front wheels run on a pump road surface, the first shock absorbers will bounce up and down together with the front wheels to reduce shock transmission between the front wheels and the chassis, preventing shock from being transmitted to the seat via the chassis, so that the user on the seat will feel less shock. Besides, the structure of the first shock absorbers can produce shock absorbing effect in all directions, unlike the springs that produce shock absorbing effect only in the vertical direction. The first shock absorbers also take much less space than the springs, which is conducive to miniaturization of the mobility scooter.

DETAILED DESCRIPTION OF THE PREFERRED EMBODIMENTS

Figure 1:
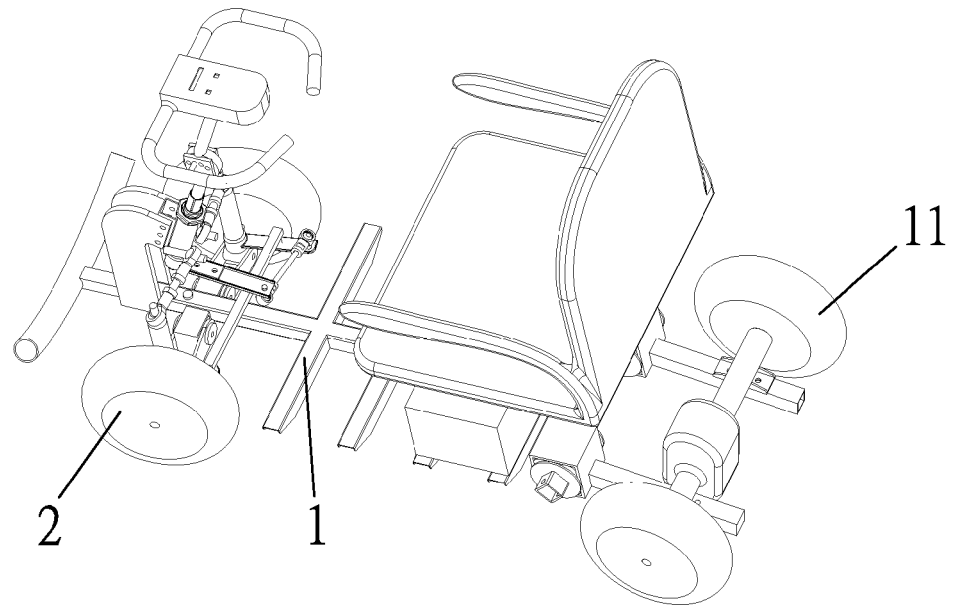
FIG. 1 is an illustrative view of a damping assembly for a front-wheel independent suspension system for a mobility scooter in accordance with the present invention.
Figure 2:
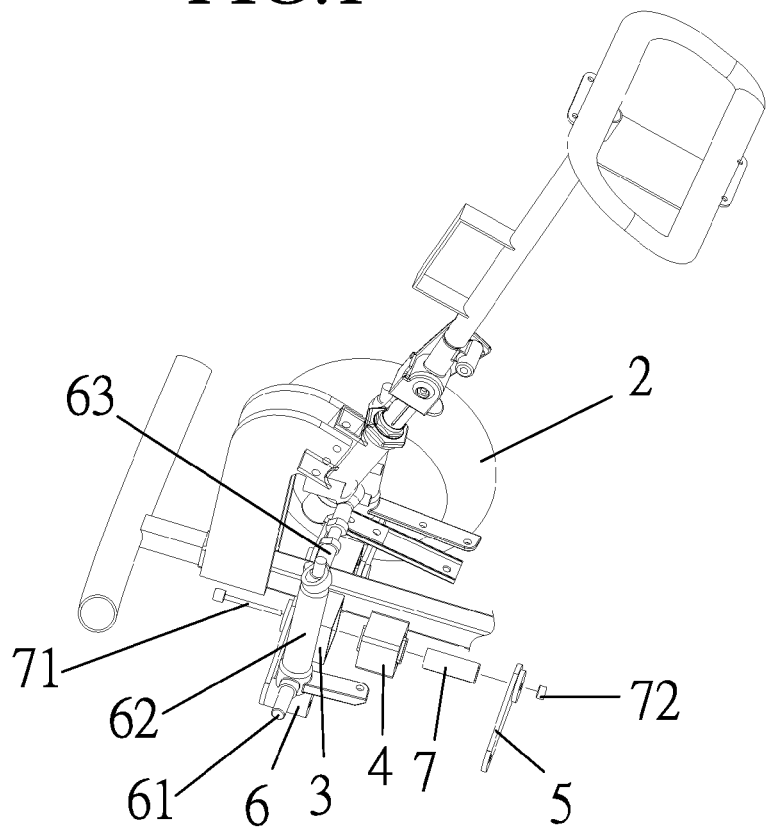
FIG. 2 is an exploded view of the front wheel suspension of the present invention.
Figure 3:
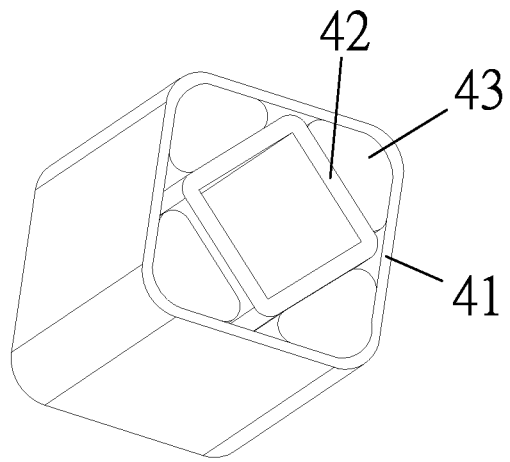
FIG. 3 shows a shock absorber of the damping assembly for the front-wheel independent suspension system for a mobility scooter in accordance with the present invention.
Figure 4:
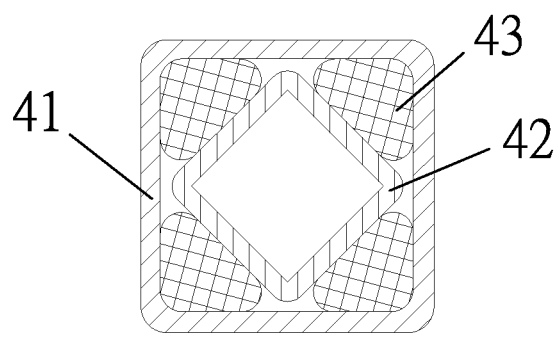
FIG. 4 is a cross sectional view of FIG. 3.
Figure 5:
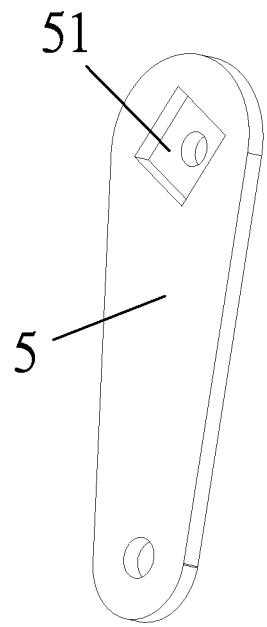
FIG. 5 shows a suspension arm of the damping assembly for the front-wheel independent suspension system for a mobility scooter in accordance with the present invention.

The present invention will be clearer from the following description when viewed together with the accompanying drawings, which show, for purpose of illustrations only, the preferred embodiment in accordance with the present invention.

Referring to FIGS. 1-6, a damping assembly for a front-wheel independent suspension of a four-wheel mobility scooter in accordance with the present invention comprises a chassis 1 which is provided with two front wheels 2 and two connecting sleeves 3 which are located at two sides thereof and extend in a width direction of the chassis 1. In each of the connecting sleeves 3 is disposed a first shock absorber 4 which includes a rectangular outer pipe 41 and a rectangular inner pipe 42 disposed in and rotated 45 degrees with respect to the outer pipe 41, so that the edges of the inner pipe 42 are abutted against the inner surface of the outer pipe 41. Between each of the edges of the inner pipe 42 and the inner space of the outer pipe 41 is disposed an elastic rubber 43. At two ends of the inner pipe of the respective first shock absorbers 4 are fixed two suspension arms 5 which are connected to a shaft 6, respectively. Each of the shafts 6 is provided with a first connecting arm 61 extending in the width direction of the chassis 1. The front wheels 2 are connected to the first connecting arms 61 and pivoted to the suspension arms 5 via the shafts 6. When the mobility scooter runs on a bumpy road surface, the suspension arms 5 can bounce up and down because of the first shock absorbers 4, and the shafts 6 can prevent the front wheels 2 from being inclined due to the up and down bouncing of the suspension arms 5, ensuring that all the front wheels 2 stand vertically on the road surface. To prevent arbitrary sway of the shafts 6 with respect to the suspension arms 5, on each of the shafts 6 is provided a second connecting arm 62 which extends upward and is hinged with a third connecting arm 63 extending in the width direction of and hinged to the chassis 1. The front wheels 2 are independently suspended from the chassis 1 via the first shock absorbers 4 and the suspension arms 5.

Figure 6:
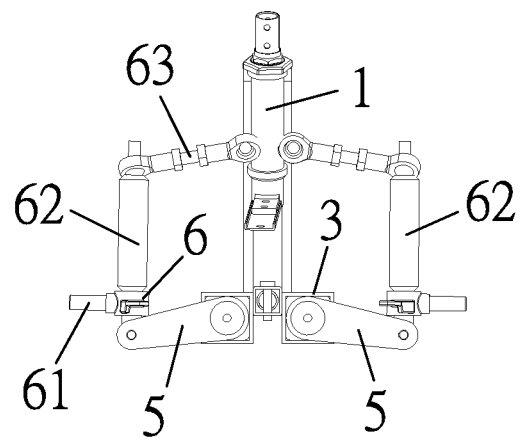
FIG. 6 shows that the chassis, the suspension arms, the second and third suspension arms form a quadrangular balancing mechanism
Figure 7:
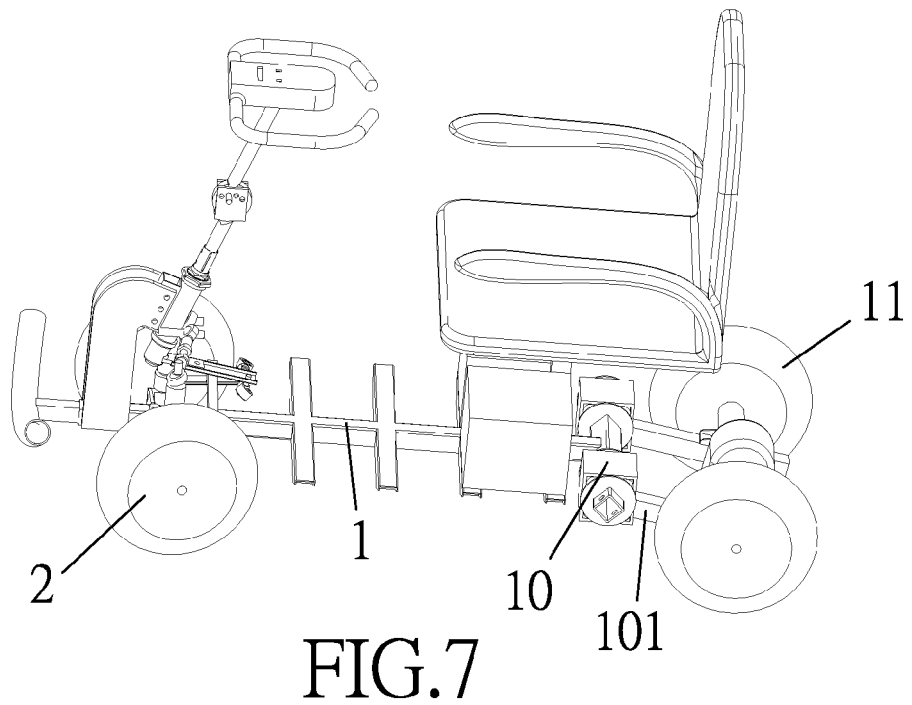
FIG. 7 is another angle view of FIG. 1.
Figure 8:
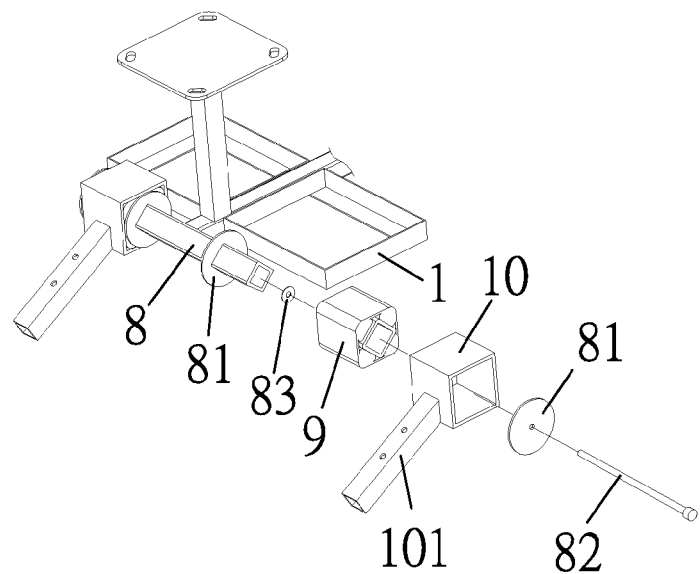
FIG. 8 is an exploded view of a rear-wheel part of the damping assembly for the front-wheel independent suspension system for a mobility scooter in accordance with the present invention.

In this embodiment, each of the third connecting arms 63 has two ends hinged to the chassis 1 and a corresponding one of the second connecting arms 62 by a universal rotation means. The universal rotation means is shown in FIG. 6, or can also be a general hinge shaft.

To assemble the suspension arms 5, in the inner pipe of the respective first shock absorbers 4 is inserted a square pipe 7 which is to be engaged in a square cavity 51 formed in each of the suspension arms 5, then a bolt 71 is inserted through the corresponding suspension arm 5 and screwed with a nut 72, so as to fix the suspension arm 5 to the square pipe 7. Or, without the square pipe 7, the suspension arm 5 can also be fixed to the corresponding one of the first shock absorbers 4, wherein the inner pipe of the first shock absorber 4 protrudes out of the outer pipe, so that the square cavity 51 of the suspension arm 5 can be directly engaged with the inner pipe of the first shock absorber 4.

Figure 9:
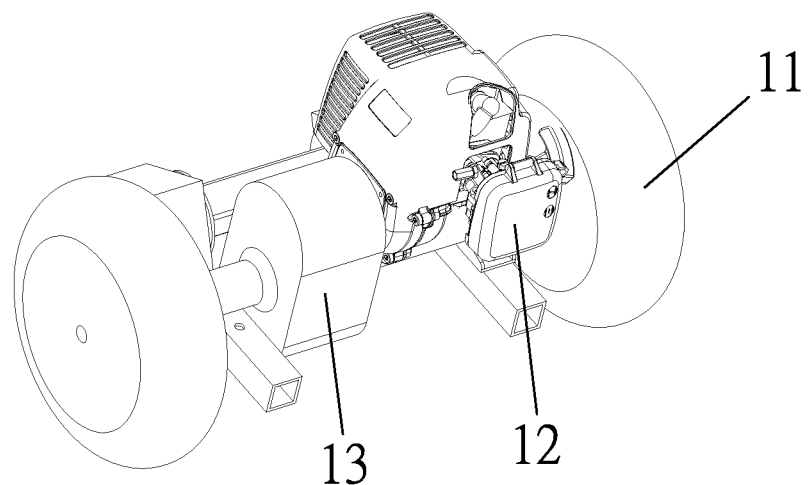
FIG. 9 shows that the rear axle of the present invention is equipped with a gasoline engine.
Figure 10:
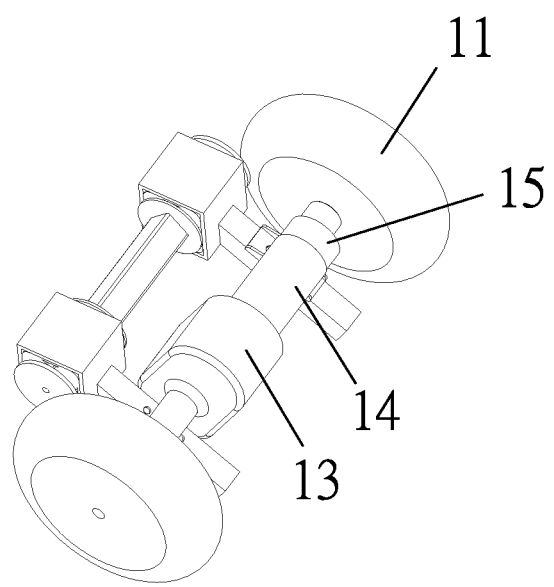
FIG. 10 shows that the rear axle of the present invention is equipped with an electric drive motor.
Figure 11:
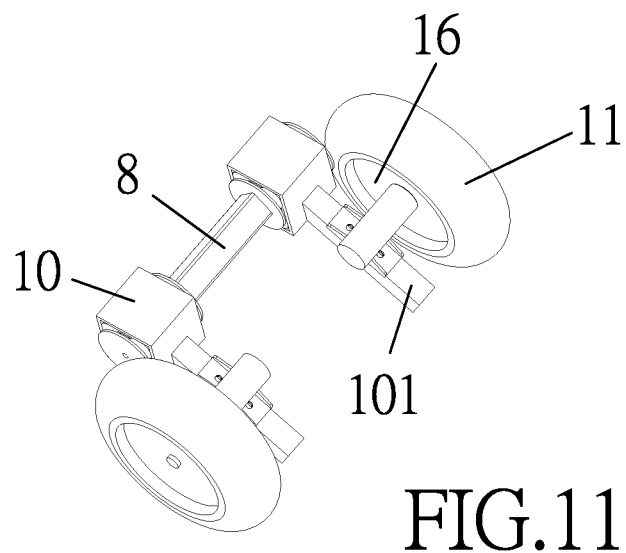
FIG. 11 shows that the rear axle of the present invention is equipped with a but motor.
Figure 12:
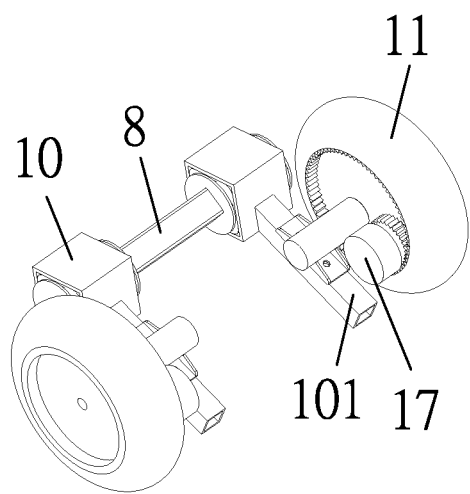
FIG. 12 shows that the rear axle of the present invention is equipped with a motor gear.

Referring to FIGS. 7-12, a rail 8 is disposed at the rear end of the chassis 1 and extends along the width direction of the chassis 1, so as to improve shock absorbing effect. At each end of the rail 8 is connected a second shock absorber 9 which is structurally the same as the first shock absorbers 4. The rail 8 is rectangular-shaped in cross section and inserted in the inner pipe of the second shock absorbers 9. In this embodiment, the rail 8 is provided with four positioning pieces 81 which are located at both ends of the respective second shock absorbers 9 in such a manner that the positioning pieces 81 located between the second shock absorbers 9 are welded to the rail 8, and the positioning pieces 81 located outside the second shock absorbers 9 are fixed by bolts 82. Inside the rail 8 are welded fixing members 83 with inner thread for mating with the bolts 82, so as to restrict the axial movement of the second shock absorbers 9 with respect to the rail 8. On each of the second shock absorbers 9 is sleeved a second connecting sleeve 10 and a connecting rod 101 extending backward from the second connecting sleeve 10. To the connecting rods 101 are connected the rear wheels 11, so that the rear wheels 11 are independently suspended from the chassis 1 via the second connecting sleeves 10 and the second shock absorbers 9. The rear wheels 11 can be driven to rotate by a gasoline engine 12, as shown in FIG. 9, wherein the rear axle is equipped with a gearbox 13, or by an electric drive motor 14 as shown in FIG. 10, wherein the rear axle is equipped with the gearbox 13 and an electromagnetic brake 15, or rear wheels 11 can be driven to rotate by a hub motor 16 as shown in FIG. 1 or by a motor gear 17, wherein the motor can be brush or brushless motor.

With the suspension arms 5 and the first shock absorbers 4, each of the front wheels 2 can be independently suspended from the chassis 1, unlike the conventional suspension, in which springs are disposed between the seat and the chassis 1. When the front wheels 2 run on a pump road surface, the first shock absorbers 4 will bounce up and down together with the front wheels 2 to reduce shock transmission between the front wheels 2 and the chassis 1, preventing shock from being transmitted to the seat via the chassis, so that the user on the seat will feel less shock. Besides, the structure of the first shock absorbers 4 can produce shock absorbing effect in all directions, unlike the springs that produce shock absorbing effect only in the vertical direction. The first shock absorbers 4 also take much less space than the springs, which is conducive to miniaturization of the mobility scooter.

While we have shown and described various embodiments in accordance with the present invention, it is clear to those skilled in the art that further embodiments may be made without departing from the scope of the present invention.

What is claimed is:

1. A damping assembly for a front-wheel independent suspension of a four-wheel mobility scooter comprising a chassis with two front wheels, and two connecting sleeves located at two sides of the chassis and extending in a width direction of the chassis, the damping assembly being characterized in that: in each of the connecting sleeves is disposed a first shock absorber which includes a rectangular outer pipe and a rectangular inner pipe disposed in and rotated 45 degrees with respect to the outer pipe, so that edges of the inner pipe are abutted against the inner surface of the outer pipe, between each of the edges of the inner pipe and the inner space of the outer pipe is disposed an elastic rubber, at two ends of the inner pipe of the respective first shock absorbers are fixed two suspension arms which are connected to a shaft, respectively, each of the shafts is provided with a first connecting arm extending in a width direction of the chassis, the front wheels are connected to the first connecting arms, on each of the shafts is provided a second connecting arm which extends upward and is hinged with a third connecting arm extending in the width direction of and hinged to the chassis, the front wheels are independently suspended from the chassis via the first shock absorbers and the suspension arms.

2. The damping assembly for the front-wheel independent suspension of the four-wheel mobility scooter as claimed in claim 1, wherein a square pipe is inserted in the inner pipe of the respective first shock absorbers and engaged in a square cavity formed in each of the suspension arms, then a bolt is inserted through the corresponding suspension arm and screwed with a nut, so as to fix the suspension arm to the square pipe.

3. The damping assembly for the front-wheel independent suspension of the four-wheel mobility scooter as claimed in claim 1, wherein each of the third connecting arms has two ends hinged to the chassis and a corresponding one of the second connecting arms by a universal rotation means.

4. The damping assembly for the front-wheel independent suspension of the four-wheel mobility scooter as claimed in claim 2, wherein each of the third connecting arms has two ends hinged to the chassis and a corresponding one of the second connecting arms by a universal rotation means.

\* \* \* \* \*